United States Patent
Takahashi (10) Patent No.: US 8,890,748 B2
(45) Date of Patent: Nov. 18, 2014

(54) METHOD AND DEVICE FOR DISCRIMINATING AMONG LOCATIONS OF A MOBILE TERMINAL

(75) Inventor: Gen Takahashi, Tokyo (JP)

(73) Assignee: NEC Corporation, Tokyo (JP)

(*) Notice: Subject to any disclaimer, the term of this patent is extended or adjusted under 35 U.S.C. 154(b) by 399 days.

(21) Appl. No.: 13/294,494

(22) Filed: Nov. 11, 2011

(65) Prior Publication Data

US 2012/0119949 A1 May 17, 2012

(30) Foreign Application Priority Data

Nov. 15, 2010 (JP) ................. 2010-254435

(51) Int. Cl.
*G01S 3/02* (2006.01)
*G01S 5/00* (2006.01)
*G01S 19/46* (2010.01)
*G01S 19/12* (2010.01)
*G01S 5/02* (2010.01)

(52) U.S. Cl.
CPC ............... *G01S 19/12* (2013.01); *G01S 5/0036* (2013.01); *G01S 19/46* (2013.01); *G01S 5/0252* (2013.01)
USPC .......................................... 342/450

(58) Field of Classification Search
USPC .................. 342/450, 357.46, 357.49
See application file for complete search history.

(56) References Cited

U.S. PATENT DOCUMENTS

2006/0232472 A1* 10/2006 Roslak ........................ 342/457
2010/0291949 A1* 11/2010 Shapira et al. ............. 455/456.1

FOREIGN PATENT DOCUMENTS

| JP | H9-297171 A | 11/1997 |
|---|---|---|
| JP | H10-94040 A | 4/1998 |
| JP | 2002-222083 A | 8/2002 |
| JP | 2003-87361 A | 3/2003 |
| JP | 2004-245657 A | 9/2004 |
| JP | 2005351823 A | 12/2005 |
| JP | 2007232592 A | 9/2007 |
| JP | 2008005476 A | 1/2008 |
| JP | 2009-281927 A | 12/2009 |
| JP | 2010-38895 A | 2/2010 |

OTHER PUBLICATIONS

J. Mingzhe, "R to Hanbetsu Bunseki", ESTRELA, Statistical Information Institute for Consulting and Analysis, No. 129, Dec. 2004, pp. 61-67.
Japanese Office Action for JP Application No. 2010-254435 mailed on May 27, 2014 with partial English Translation.

* cited by examiner

*Primary Examiner* — Harry Liu (74) *Attorney, Agent, or Firm* — Sughrue Mion, PLLC (57) ABSTRACT

A location-information discrimination method and device are provided that can accurately discriminate between locations of a mobile terminal in keeping with an actual environment. A discrimination value calculator calculates a discrimination value that is dependent on the amount of a change, from a predetermined value, in the received power of a radio signal received by a mobile terminal from a base station and on the duration of that change in the received power. The determination section compares the discrimination value with a predetermined value, thereby determining whether the mobile terminal is located indoors or outdoors.

24 Claims, 4 Drawing Sheets

METHOD AND DEVICE FOR DISCRIMINATING AMONG LOCATIONS OF A MOBILE TERMINAL

BACKGROUND OF THE INVENTION

1. Field of the Invention

This application is based upon and claims the benefit of priority from Japanese Patent Application No. 2010-254435, filed on Nov. 15, 2010, the disclosure of which is incorporated herein in its entirety by reference.

The present invention relates to a location-information discrimination system and, more particularly, to a method and device for discriminating among locations of a mobile terminal.

2. Description of the Related Art

There have been proposed various methods for determining whether a mobile terminal is located outdoors or indoors. According to indoors/outdoors determination methods using the Global Positioning System (GPS), an area that cannot be identified by the GPS is determined to be the indoors in many cases. Therefore, also proposed are indoors/outdoors determination methods using base stations of a mobile communication system in addition to the GPS.

For example, in an indoors/outdoors determination system disclosed in Japanese Patent Application Unexamined Publication No. 2007-232592 (JP2007-232592), a terminal acquires location information from each of the GPS and a mobile telephone base station (BS) and makes an indoors/outdoors determination in accordance with a determination rule based on such location information and the way of acquiring the location information, GPS/BS/GPS&BS.

Japanese Patent Application Unexamined Publication No. 2005-351823 (JP2005-351823) discloses a device that makes it possible to analyze the location of a terminal regardless of whether the terminal is located indoors or outdoors in such a manner that, with a wireless LAN location detection system being provided indoors, GPS location information and wireless LAN location information are integrated. Moreover, Japanese Patent Application Unexamined Publication No. 2008-005476 (JP2008-005476) discloses a method for estimating the location of a wireless terminal in such a manner that a probability distribution based on the electromagnetic characteristics of a signal from a base station is combined with a probability distribution based on the GPS.

In the above-mentioned indoors/outdoors determination system disclosed in JP2007-232592, indoors/outdoors determinations are made correspondingly to the three patterns of way of acquiring location information (that is, acquiring only from GPS, acquiring only from BS, and acquiring from both of GPS and BS). Therefore, the resolution of determination is coarse, and realistically, there are some cases where no right indoors/outdoors determination can be made.

Although JP2005-351823 and JP2008-005476 disclose the terminal location detection methods, these methods do not relate to indoors/outdoors determination. For example, according to JP2005-351823, since a wireless LAN location detection system needs to be provided indoors, the system configuration is complicated, and costs also rise. Additionally, it is impossible to perform terminal location detection itself in those buildings that are not provided with such an indoor system. Further, according to JP2008-005476, terminal location estimation is performed by utilizing the fact that the characteristics of an electromagnetic signal change depending on geographic features, the locations of a receiver and a sender, and the like. This is not an indoors/outdoors determination technology for a terminal.

Accordingly, with the methods taught by the above-mentioned patent literatures, it is difficult to always accurately determine the environment in which a terminal is located, such as the inside of an arcade or a building. Therefore, there are occasions when a provider providing advertisement information depending on the location of a terminal cannot provide appropriate information to users. Moreover, according to the above-mentioned patent literatures, the precision of determination is fixed, and it is impossible to make a determination in keeping with a situation.

SUMMARY OF THE INVENTION

Accordingly, an object of the present invention is to provide a location-information discrimination method and device that can accurately discriminate among locations of a mobile terminal in keeping with an actual use environment.

According to the present invention, a device for discriminating among locations of a mobile terminal which is capable of communicating with a base station of a mobile communication system, includes a discrimination value calculator for calculating a discrimination value depending on data for discrimination which includes the amount of a change in received power with respect to a predetermined power value and a duration of changing received power, wherein received power is a received power level of a radio signal which the mobile terminal receives from the base station; and a determination section for determining whether the mobile terminal is located indoors or outdoors, based on a result of comparison between the discrimination value and a predetermined value.

According to the present invention, a method for discriminating among locations of a mobile terminal which is capable of communicating with a base station of a mobile communication system, includes the steps of: calculating a discrimination value depending on data for discrimination which includes the amount of a change in received power with respect to a predetermined power value and a duration of changing received power, wherein received power is a received power level of a radio signal which the mobile terminal receives from the base station; and determining whether the mobile terminal is located indoors or outdoors, based on a result of comparison between the discrimination value and a predetermined value.

According to the present invention, a system includes: a base station of a mobile communication system; a mobile terminal which is capable of communicating with the base station; and a location-information discrimination device includes: a discrimination value calculator for calculating a discrimination value depending on data for discrimination which includes the amount of changing received power with respect to a predetermined power value and a duration of changing received power, wherein received power is a received power level of a radio signal which the mobile terminal receives from the base station; and a determination section for determining whether the mobile terminal is located indoors or outdoors, based on a result of comparison between the discrimination value and a predetermined value.

According to the present invention, it is possible to accurately discriminate among locations of a mobile terminal in keeping with an actual use environment.

DETAILED DESCRIPTION OF THE PREFERRED EMBODIMENT

1. System Configuration

Figure 1:
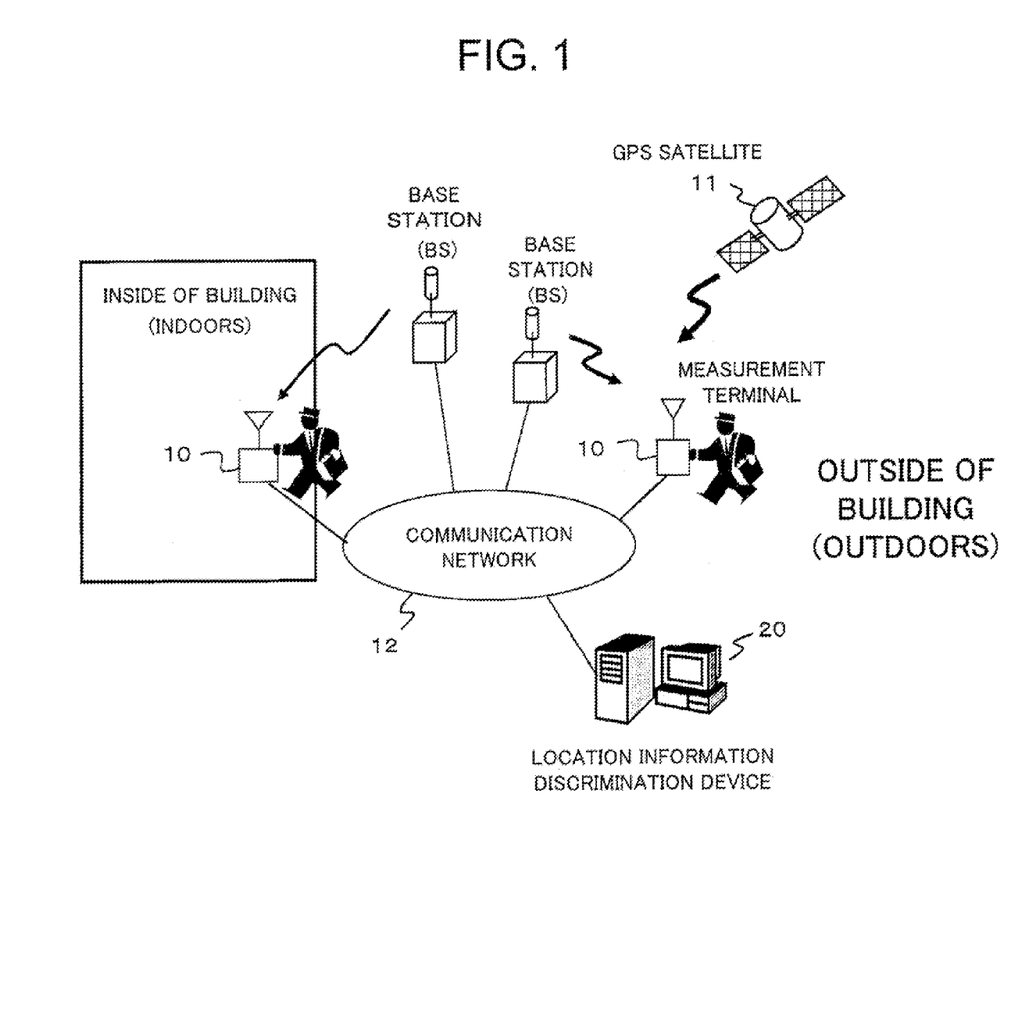
FIG. 1 is a schematic diagram of a network system to which a location-information discrimination system according to an exemplary embodiment of the present invention is applied.

Referring to FIG. 1, a measurement terminal 10 carried by a user is a means for acquiring measurement information and has a function of receiving any one of, or both of, a GPS signal from a GPS satellite 11 and a signal from a base station BS of a mobile communications system. Moreover, the measurement terminal 10 has a communication function of communicating with a location-information discrimination device 20 through a wired or wireless communication network 12. Additionally, the measurement terminal 10 is assumed to have an operation section, a monitor, and the like (not shown) for a user to enter data and various settings. It is also possible to implement the same functions as those of the measurement terminal 10 into a mobile communication terminal such as a mobile telephone carried by a user. Note that it is assumed here that the communication network 12 includes the mobile communications system.

The measurement terminal 10 can be moved to the outside of a building (outdoors) or to the inside of a building (indoors) by being carried by a user. The measurement terminal 10, upon acquiring measurement information, sets the measurement information for training or for discrimination and sends it to the location-information discrimination device 20, which will be described later. The location-information discrimination device 20 stores the received measurement information as data for training when the measurement information is for training. If the received measurement information is for discrimination, the location-information discrimination device 20 determines based on this data for discrimination whether the location is the indoors or the outdoors through discriminant analysis using data for training hitherto stored.

Figure 2:
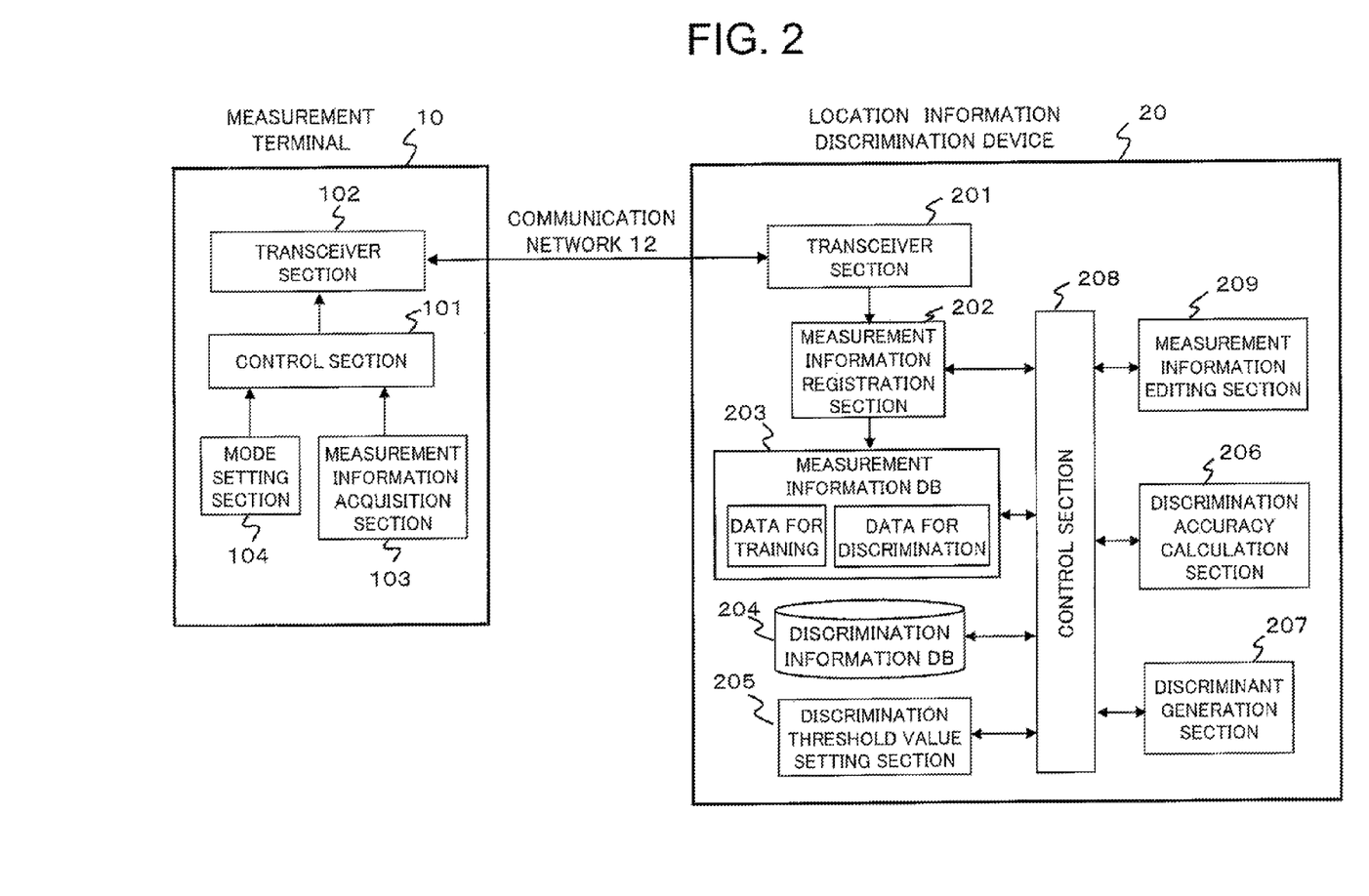
FIG. 2 is a block diagram showing the functional configurations of a measurement terminal and a location-information discrimination device in the location-information discrimination system according to the present exemplary embodiment.

Referring to FIG. 2, a location-information discrimination system according to an exemplary embodiment includes the measurement terminal 10 and the location-information discrimination device 20, and the measurement terminal 10 and location-information discrimination device 20 are connected to each other via the communication network 12.

The measurement terminal 10 includes a control section 101 that controls operations such as input of information and acquisition of measurement information, which will be described later. A transceiver section 102 connects the measurement terminal 10 to the communication network 12 to communicate with the location-information discrimination device 20, under the control of the control section 101.

A measurement-information acquisition section 103, under the control of the control section 101, detects the presence/absence of radio signals received from the GPS satellite 11 and base station BS and acquires GPS information (latitude and longitude information on the measurement terminal 10) at certain time t and received power Pr of the radio signal received from the base station BS.

A mode setting section 104 sets the measurement information to a training mode to use it for training or a discrimination mode to subject it to discrimination processing in accordance with a designation made by a user. That is, when the measurement information is acquired in a situation in which it is known which the location is, the indoors or the outdoors, the user sets a mode such that the measurement information is for training. When the user makes no setting for training, since it is unknown whether the location is the indoors or the outdoors, a mode is set such that the measurement information is for discrimination so that discrimination processing should be performed.

The location-information discrimination device 20 is connected to the communication network 12 through a transceiver section 201 and thereby can communicate with the measurement terminal 10. The location-information discrimination device 20 further includes a measurement-information registration section 202 and a measurement information database (DB) 203. The measurement-information registration section 202 performs, based on control information, registration processing on measurement information received from the measurement terminal 10, and the measurement information DB 203 stores the measurement information subjected to the registration processing.

The measurement information DB 203 stores data received from the measurement terminal 10 as data for training or data for discrimination, depending on the type of data or the result of discrimination. The stored data (measurement information) contains various kinds of information including the acquisition time t, GPS-based latitude and longitude, BS detection presence/absence Fb, GPS detection presence/absence Fg, and received power Pr.

The location-information discrimination device 20 further includes a discrimination information database (DB) 204, a discrimination threshold value setting section 205, a discrimination accuracy calculation section 206, a discriminant generation section 207, a control section 208, and a measurement-information editing section 209, as means for executing situation discrimination processing, which will be described later.

The discrimination information DB 204 stores information required for discriminant generation and discrimination processing. Specifically, stored are coefficient information as to a discriminant generated by the discriminant generation section 207, as well as threshold information on time, received power, and rate of erroneous discrimination set by the discrimination threshold value setting section 205 and discrimination result information.

The discrimination threshold value setting section 205 sets a threshold value for detecting a change in received power, a threshold value of the duration of the received power exceeding the threshold value for detecting a change in received power (that is, a duration for determining that the measurement terminal has moved from indoors to outdoors or from outdoors to indoors), and a threshold value for discriminating, based on the result of calculation of the discriminant, between the indoors and the outdoors.

The discrimination accuracy calculation section 206 applies a discriminant generated by using the coefficient information stored in the discrimination information DB 204 to the data for training stored in the measurement information DB 203, thereby calculating a rate of erroneous discrimination based on the results of discrimination performed on the data for training. The control section 208 stores the rate of erroneous discrimination in the discrimination information DB 204.

The discriminant generation section 207 calculates, from the data for training, coefficients required for, for example, linear discriminant analysis and linearly combines the calculated coefficients and variables, thereby generating a discriminant, which will be described later. The coefficients thus calculated are stored in the discrimination information DB 204.

The control section 208 controls data retrieval, data writing, transfer notification and the like between the functional sections used when performing the under-mentioned location-information discrimination processing, that is, the respective components: the measurement information DB 203; discrimination information DB 204; discrimination threshold value setting section 205; discrimination accuracy calculation section 206; and discriminant generation section 207.

Furthermore, the measurement-information editing section 209 has a function of controlling the measurement-information registration section 202 such that, in the processing of registering measurement information by the measurement-information registration processing 202, when the result of indoors/outdoors discrimination performed for data for discrimination can be verified later, this data for discrimination is changed to data for training and registered. Moreover, the measurement-information editing section 209 also has a function of deleting measurement information in a case, for example, where more losses than expected occur in the time information on the measurement information or where an error occurs at the time of transfer from the measurement terminal 10 resulting in the measurement information being inappropriate for registration.

Note that it is also possible to implement functions equivalent to the discrimination threshold value setting section 205, discrimination accuracy calculation section 206, discriminant generation section 207, control section 208, and measurement-information editing section 209 as described later, by executing programs stored in a memory (not shown) on a program-controlled processor such as a CPU or a computer (not shown).

2. Operation

In the above-described system according to the present exemplary embodiment, when it is known beforehand that measurement by the measurement terminal 10 is performed inside of a building or outside of a building, a user designates measurement information as data for training by operating the measurement terminal 10, and the measurement information is stored as data for training in the measurement information DB 203 of the location-information discrimination device 20.

When the location measured by the termination terminal 10 is not designated as indoor or outdoor, measurement data is stored as data for discrimination in the measurement information DB 203 because indoors/outdoors information is unknown, and indoors/outdoors discrimination processing is performed as will be described later. If the result of discrimination made through this indoors/outdoors discrimination processing can be verified later, the data for discrimination is then stored as data for training along with the result of indoors/outdoors discrimination in the measurement information DB 203. Hereinafter a location-information discrimination method according to the present exemplary embodiment will be described in detail with reference to FIG. 3.

Figure 3:
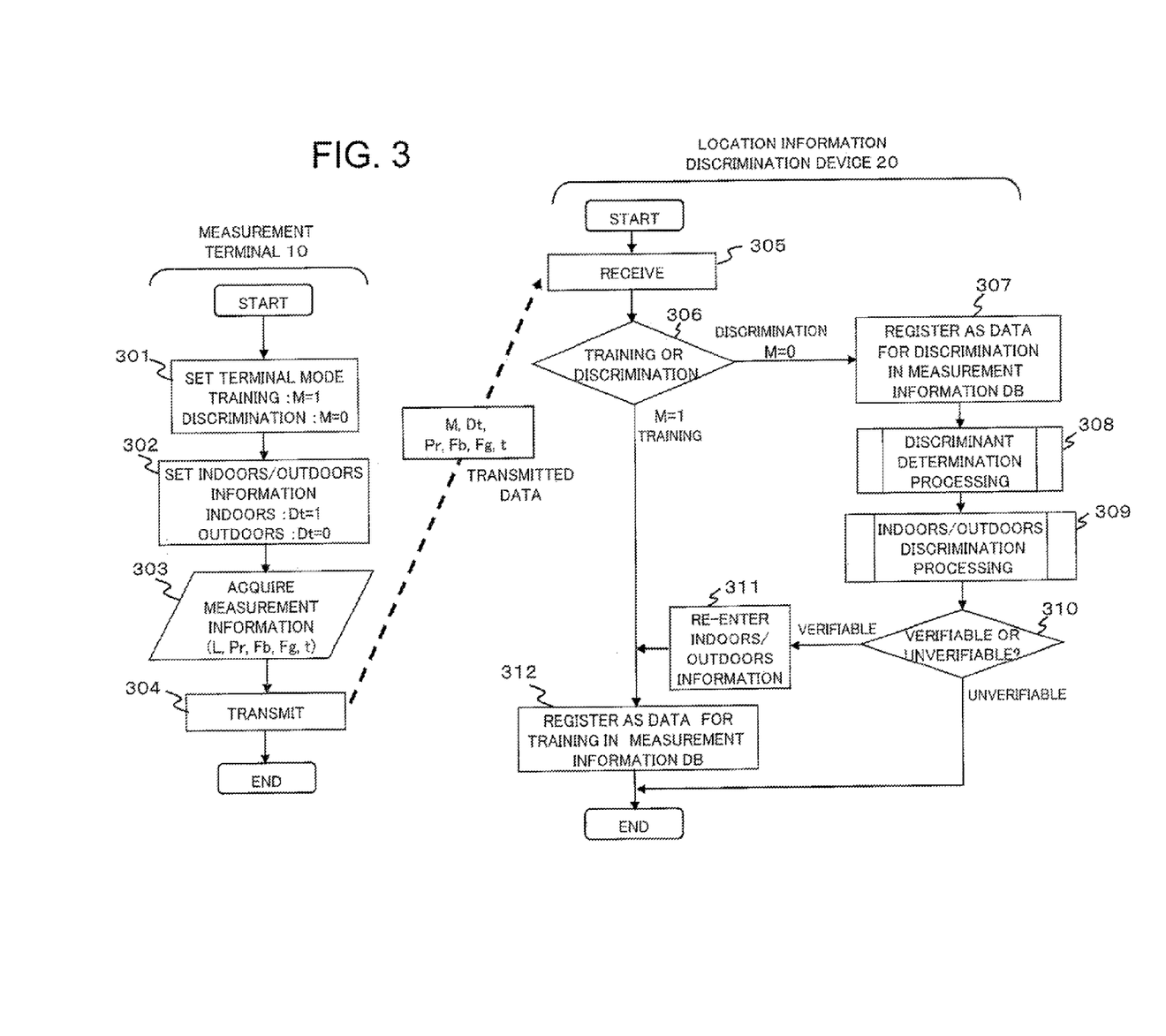
FIG. 3 is a flowchart showing a location-information discrimination method according to the present exemplary embodiment.

Referring to FIG. 3, first, if it is known beforehand that measurement by the measurement terminal 10 is performed inside of a building or outside of a building, a user operates the mode setting section 104 of the measurement terminal 10, thereby setting a terminal mode M for training (M=1). If the user makes no setting, for example, the control section 101 sets the terminal mode M for discrimination (M=0) (Step 301).

When the terminal mode M is set for training (M=1), the user further sets indoors/outdoors information Dt for indoors (Dt=1) or outdoors (Dt=0) (Step 302). Note that when the terminal mode M is set for discrimination (M=0), the indoors/outdoors information Dt is set for a specified character string (for example, N/A or a blank character).

Subsequently, the measurement-information acquisition section 103 receives any one or both of GPS information and BS information, thereby acquiring various kinds of information such as the acquisition time t, the received power Pr of a radio signal received from a base station BS, the flag Fb indicating the presence/absence of the BS information, the flag Fg indicating the presence/absence of the GPS information, and the GPS information L (latitude and longitude information on the measurement terminal 10) (Step 303). The control section 101 controls the transceiver section 102, thereby transmitting data containing such acquired information acquired and setting information to the location-information discrimination device 20 via the communication network 12 (Step 304). This transmitted data contains at least the above-described terminal mode M, indoors/outdoors information Dt, received power Pr, BS information presence/absence flag Fb, GPS information presence/absence flag Fg, and measurement time information t in a predetermined format.

The control section 208 of the location-information discrimination device 20, upon receipt of the data from the measurement terminal 10 (Step 305), checks the terminal mode M contained in the data (Step 306). When the terminal mode M is discrimination (Step 306: M=0), the measurement-information registration section 202, under the control of the control section 208, registers the received data as data for discrimination in the measurement information DB 203 (Step 307).

Subsequently, the control section 208 performs discrimination-information determination processing (Step 308) and indoors/outdoors discrimination processing (Step 309), which will be described later, thereby determining whether the environment in which the measurement terminal 10 is located is the indoors or the outdoors. If the result of discrimination can be verified (Step 310: VERIFIABLE), the indoors/outdoors information Dt in the data for discrimination is rewritten to be the verified information (Dt=1 or 0) (Step 311), and this data for discrimination is registered as data for training in the measurement information DB 203 (Step 312). When the result of discrimination is not verified (Step 310: UNVERIFIABLE), this data for discrimination is not registered as data for training.

When the received data is data for training (Step 306: M=1), the measurement-information registration section 202, under the control of the control section 208, registers the received data as data for training as it is in the measurement information DB 203 (Step 312).

Thus, measurement information set as data for training at the measurement terminal 10 is stored as data for training in the measurement information DB 203 at the location-information discrimination device 20, and even measurement information set as data for discrimination is stored as data for training if a discrimination between the indoors and the outdoors can be made through verification. Accordingly, data for training is updated not only each time the training mode is received but also when the discrimination mode is received if indoors/outdoors discrimination can be verified. That is, according to the present exemplary embodiment, discrimination capability can be grasped in advance by using discriminant analysis. After estimation is performed by using data for discrimination, the result of estimation that can be verified is fed back as data for training, whereby it is possible to increase accuracy in location-information discrimination.

3. Discrimination-Information Determination Processing 3.1) Discriminant Determination Processing The stored data for training is used to establish a discriminant, which will be described next.

Figure 4:
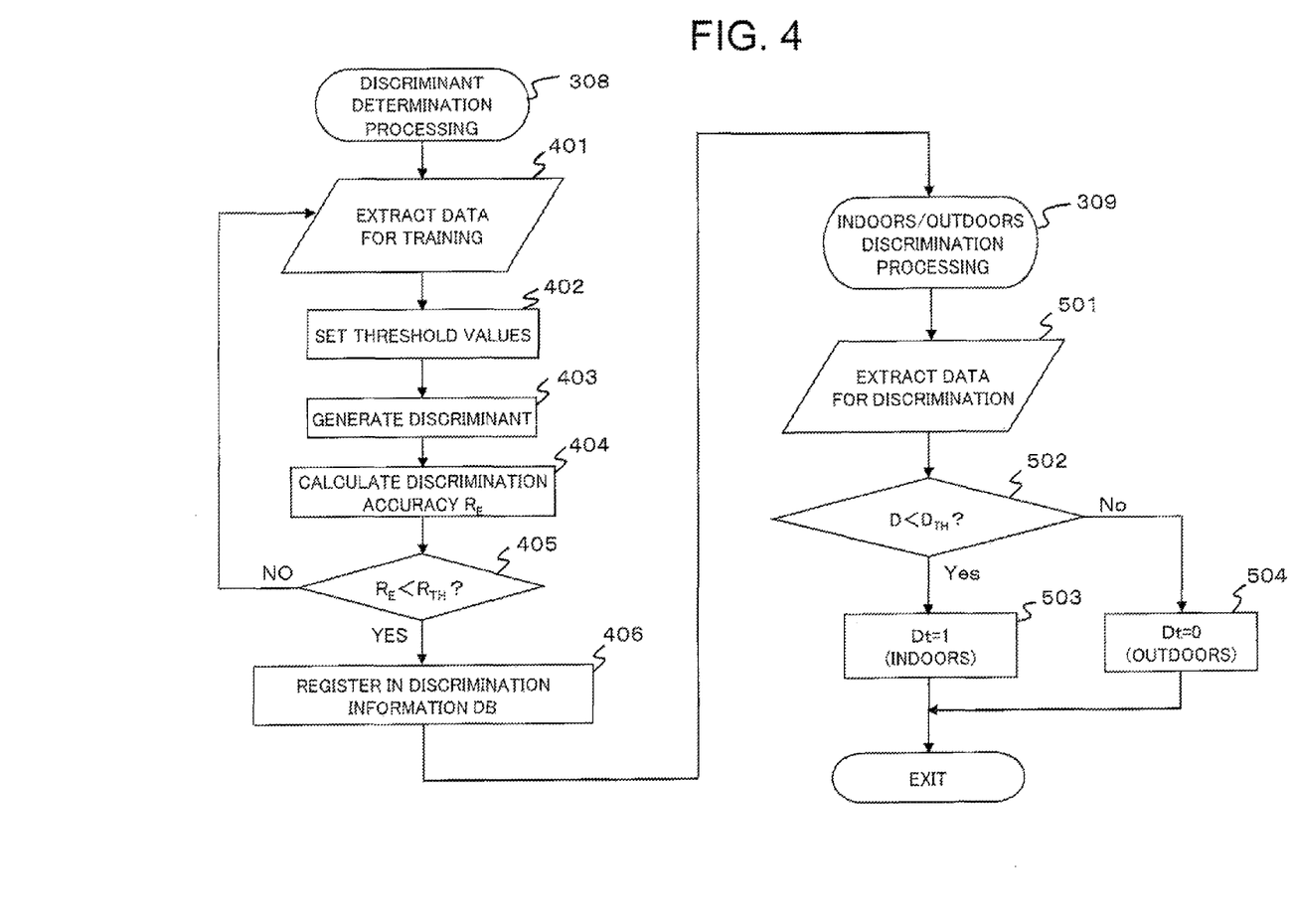
FIG. 4 is a flowchart showing a procedure of determining discrimination information in FIG. 3.

Referring to FIG. 4, the control section 208 first extracts data for training from the measurement information DB 203 (Step 401) and also reads discrimination threshold values from the discrimination information DB 204 to set them on the discrimination threshold value setting section 205 (Step 402). The discrimination threshold values include a discrimination accuracy $R_{TH}$ and a threshold value $D_{TH}$ for discriminating between the indoors and the outdoors based on a calculation result D of calculating a discriminant.

Once the discrimination threshold values are set, the discriminant generation section 207, under the control of the control section 208, determines coefficients a1 to a4 by using the data for training and discrimination threshold values, based on the following linear discriminant (1) (Step 403).

$$D=a1*(t-t0)+a2*(Pr0-Pr)+a3*Fb+a4*Fg \quad (1),$$

where D is a calculation value for indoors/outdoors discrimination, and t, Pr, Fb, and Fg are the time of acquiring information, received power, BS information presence/absence flag, and GPS information presence/absence flag, respectively, with respect to the extracted data for training.

The coefficients a1 to a4 of the discriminant in the present exemplary embodiment are determined through general linear discriminant analysis (for example, see "ESTRELA" December 2004 (No. 129), pp. 61-67, published by Statistical Information Institute for Consulting and Analysis). As shown by the above discriminant (1), the calculation value D for indoors/outdoors discrimination is calculated based on the period of time for which a level difference in received power lasted under a certain condition of detection of GPS information and BS information.

The time t0 at which a change occurred from outdoors to indoors or from indoors to outdoors can be identified in the data for training. The duration of the received power exceeding (or falling below) the threshold value is expressed by "t–t0". In the above discriminant (1), "t–t0" has the meaning of the period of time required for determining that the measurement terminal has moved from indoors to outdoors or from another outdoor point to indoors. It is possible to determine that the measurement terminal 10 has moved to outdoors or indoors in the following manner. Assuming that Pr0 is the received power when t=t0, a change in "t–t0" and a change in "Pr0–Pr" are each measured, and it is formulated by linear combination how long the changed state has been maintained since the occurrence of the change in the outdoor/indoor state.

In the case of applying the above discriminant (1) in a certain area, the outdoors-indoors distribution ratio is not necessarily 50%:50% because of building density. For example, an urban area and a suburban area have different outdoors-indoors distribution ratios. Therefore, formulation using "t–t0" and "Pr0–Pr" as variables makes it possible to perform more refined discrimination in practical applications than formulation using "t" and "Pr" as variables.

For example, it is assumed that each of the coefficients a1 to a4 is a positive constant and that each of the flags Fb and Fg is "1" when both the BS information and GPS information are "present". When the measurement terminal 10 is located outdoors, the calculation value D for indoors/outdoors discrimination shows a large value in general because the flags Fb and Fg are each "1", the received power Pr exceeds Pr0, and the duration of this exceeding state also exceeds t0. On the other hand, when the measurement terminal 10 has moved indoors, the calculation value D for indoors/outdoors discrimination indicates a smaller value because the flags Fb and Fg both become "0", and the duration of the received power Pr falling below Pr0 possibly exceeds t0. Since the calculation value D for indoors/outdoors discrimination minutely varies depending on the environment in which the measurement terminal 10 is located as described above, it is also possible to determine, to certain degrees, the condition of surrounding buildings and the type of a building (for example, a large building, a wooden construction, an arcade, or the like).

Indoors/outdoors discrimination can be performed by comparing such a calculation value D for indoors/outdoors discrimination with the threshold value $D_{TH}$, which will be described later. Incidentally, even if the reception state changes only for a short time in the outdoors, it is possible to avoid making an erroneous determination that a movement to the indoors is made, by considering the period of time (t–t0) for which a level difference in received power (Pr–Pr0) lasts. Since indoors/outdoors discrimination is performed not only based on the presence/absence of BS information and GPS information but also additionally taking into consideration a change over time in received power, it is possible to accurately discriminate among locations of a communication terminal in keeping with an actual use environment.

Once the above-described discriminant (1) is generated; the discrimination accuracy calculation section 206, under the control of the control section 208, calculates a rate of erroneous discrimination $R_E$, which is the ratio of the number of pieces of data erroneously answered to the total number of pieces of data for training, the erroneously answered data representing the calculation value D disagreeing with the value of the indoors/outdoors information Dt indicative of the indoors or outdoors, which is already known in the extracted data for training (Step 404).

The control section 208 determines whether or not the erroneous discrimination rate $R_E$ is lower than the desired discrimination accuracy $R_{TH}$ (Step 405). When the rate of erroneous discrimination $R_E$ is lower than the discrimination accuracy $R_{TH}$ (Step 405: YES), the coefficients a1 to a4 and threshold information M0 and Pr0) in the discriminant (1) are registered with the discrimination information DB 204 (Step 406). When the rate of erroneous discrimination $R_E$ is not lower than the discrimination accuracy $R_{TH}$ (Step 405: NO), the process returns to Step 401, where data for training is extracted to change the coefficients a1 to a4 (Step 402), and Steps 401 to 405 are repeated until the rate of erroneous discrimination $R_E$ becomes lower than the discrimination accuracy $R_{TH}$. Thereby, it is possible to obtain a linear discriminant for the desired discrimination accuracy $R_{TH}$.

The control section 208 performs Step 309 for indoors/outdoors discrimination processing for data for discrimination received from the measurement terminal 10 by using the coefficients a1 to a4 and threshold information (t0 and Pr0) for the discrimination accuracy which is secured through the above-described discrimination-information determination processing (Steps 401 to 406).

3.2) Indoors/Outdoors Discrimination Processing

Subsequently, the control section 208 first extracts from the measurement information DB 203 data for discrimination received from the measurement terminal 10 (Step 501) and substitutes the measurement information (t, Pr, Fb, and Fg) of the data for discrimination and the coefficients a1 to a4 and threshold information (t0 and Pr0) registered with the discrimination information DB 204 into the above-described discriminant (1), thereby calculating the calculation value for indoors/outdoors discrimination. The control section 208 then compares the obtained calculation value D for indoors/outdoors discrimination with the threshold value $D_{TH}$ (Step 502). Here, when $D<D_{TH}$ (Step 502: YES), it is determined that the location is the indoors (Dt=1) (Step 503). When $D \geq D_{TH}$ (Step 502: NO), it is determined that the location is the outdoors (Dt=0) (Step 504). Note that it is sufficient to set the threshold value $D_{TH}$ for a value not smaller than 0.5, such as 0.8.

4. Effects

As described above, according to the present exemplary embodiment, it is possible to accurately discriminate among locations of a mobile terminal in keeping with an actual use environment, by calculating a discrimination value that is dependent on the amount of a change in received power at the mobile terminal from a predetermined value and on the duration of that changed received power. Regarding the discrimination accuracy-related challenges and problems with the schemes for enhancing discrimination accuracy in particular, a function that can discriminate between indoors and outdoors is provided by applying linear discriminant analysis, and the rate of erroneous discrimination is calculated at the time of the discriminant analysis, whereby desired discrimination performance can be easily obtained.

According to the present exemplary embodiment, a discrimination between the indoors and the outdoors is made by using discriminant analysis based on GPS information, BS information, and received power information that are acquired at a radio communication measurement terminal such as a mobile telephone. Thereby, it is possible to identify the indoors of the outdoors in an area where GPS information cannot be acquired.

Note that the present exemplary embodiment enables a system, such as a terminal data automatic collection system proposed by Open Mobile Alliance, to collect highly accurate location information required to improve area quality. For example, the present exemplary embodiment can also be applied to digital signage (electronic advertisements) systems that deliver advertisement information and contents depending on the situation.

The present invention is applicable to location-information discrimination systems using a mobile communication terminal.

The present invention may be embodied in other specific forms without departing from the spirit or essential characteristics thereof. The above-described exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for discriminating among locations of a mobile terminal configured to communicate with a base station of a mobile communication system, comprising:
    a discrimination value calculator configured to calculate a discrimination value based on:
        an amount of a change in received power;
        a duration of the received power change;
        a first value indicative of presence and absence of base station information; and
        a second value indicative of presence and absence of GPS (Global Positioning System) information of the mobile terminal,
        wherein received power is a received power level of a radio signal that the mobile terminal receives from the base station; and
    a determination section configured to determine whether the mobile terminal is located indoors or outdoors, based on a result of comparison between the discrimination value and a predetermined value.

2. The device according to claim 1, wherein the discrimination value calculator is configured to calculate the discrimination value using a linear discriminant which adds the duration multiplied by a first coefficient, the amount of the received power change multiplied by a second coefficient, the first value multiplied by a third coefficient, and the second value multiplied by a fourth coefficient.

3. The device according to claim 2, further comprising:
    a discriminant generator configured to determine the first and second coefficients based on data for training which includes amounts of received power changes for training and durations of changed reception powers for training.

4. The device according to claim 3, further comprising:
    a discrimination accuracy calculator configured to calculate a rate of erroneous discrimination as a discrimination accuracy of the linear discriminant based on a determination result obtained by using the linear discriminant generated by the discriminant generator and a discrimination result for training.

5. The device according to claim 3, wherein the discriminant generator is configured to use the data for discrimination as data for training when the determination result by the determination section based on the data for discrimination has been verified.

6. The device according to claim 3, wherein the mobile terminal comprises a receiver configured to acquire GPS information.

7. A method for discriminating among locations of a mobile terminal configured to communicate with a base station of a mobile communication system, the method comprising:
    calculating a discrimination value based on:
        the amount of a change in received power;
        a duration of the received power change;
        a first value indicative of presence and absence of base station information; and
        a second value indicative of presence and absence of GPS information of the mobile terminal,
        wherein received power is a received power level of a radio signal that the mobile terminal receives from the base station; and
    determining whether the mobile terminal is located indoors or outdoors, based on a result of comparison between the discrimination value and a predetermined value.

8. The method according to claim 7, wherein the discrimination value is calculated based on a linear discriminant which adds the duration multiplied by a first coefficient the amount of the received power change multiplied by a second coefficient, the first value multiplied by a third coefficient, and the second value multiplied by a fourth coefficient.

9. The method according to claim 8, further comprising:
    determining the first and second coefficients based on data for training which includes amounts of received power changes for training and durations of changing received power for training.

10. The method according to claim 9, further comprising:
    calculating a rate of erroneous discrimination as a discrimination accuracy of the linear discriminant based on a determination result obtained by using the linear discriminant generated by a discriminant generator and a discrimination result for training.

11. The method according to claim 9, wherein the data for discrimination is used as data for training when the determination result based on the data for discrimination has been verified.

12. The method according to claim 9, wherein the mobile terminal comprises receiver configured to acquire GPS information.

13. A system comprising:
a base station;
a mobile terminal configured to communicate with the base station; and
a location-information discrimination device comprising:
  a discrimination value calculator configured to calculate discrimination value based on:
    an amount of a change in received power;
    a duration of the received power change;
    a first value indicative of presence and absence of base station information; and
    a second value indicative of presence and absence of GPS (Global Positioning System) information of the mobile terminal,
    wherein received power is a received power level of a radio signal which the mobile terminal receives from the base station; and
  a determination section configured to determine whether the mobile terminal is located indoors or outdoors, based on a result of comparison between the discrimination value and a predetermined value.

14. The system according to claim 13, wherein the discrimination value calculator calculates the discrimination value using a linear discriminant which adds the duration multiplied by a first coefficient and the amount of the received power change multiplied by a second coefficient, the first value multiplied by a third coefficient, and the second value multiplied by a fourth coefficient.

15. The system according to claim 14, further comprising:
a discriminant generator configured to determine the first and second coefficients based on data for training which includes amounts of received power changes for training and durations of changing received power for training.

16. The system according to claim 15, further comprising:
a discrimination accuracy calculator configured to calculate a rate of erroneous discrimination as a discrimination accuracy of the linear discriminant based on a determination result obtained by using the linear discriminant generated by the discriminant generator and a discrimination result for training.

17. The system according to claim 15, wherein the discriminant generator uses the data for discrimination as data for training when the determination result by the determination section based on the data for discrimination has been verified.

18. The system according to claim 15, wherein the mobile terminal comprises a receiver configured to acquire GPS information.

19. A device for discriminating among locations of a mobile terminal, configured to communicate with a base station of a mobile communication system, the device comprising:
a discrimination value calculator configured to calculate a discrimination value depending on data for discrimination which includes the amount of a change in received power with respect to a predetermined power value and a duration of changing received power,
  wherein the received power is a received power level of a radio signal which the mobile terminal receives from the base station, and
  wherein the discrimination value calculator calculates the discrimination value using a linear discriminant which adds the duration multiplied by a first coefficient and the amount of the received power change multiplied by a second coefficient;
a determination section configured to determine whether the mobile terminal is located indoors or outdoors, based on a result of comparison between the discrimination value and a predetermined value; and
a discriminant generator configured to determine the first and second coefficients based on data for training which includes amounts of received power changes for training and durations of changed reception powers for training.

20. The device according to claim 19, further comprising:
a discrimination accuracy calculator configured to calculate rate of erroneous discrimination as a discrimination accuracy of the linear discriminant based on a determination result obtained by using the linear discriminant generated by the discriminant generator and a discrimination result for training.

21. The device according to claim 19, wherein the discriminant generator uses the data for discrimination as data for training when the determination result by the determination section based on the data for discrimination has been verified.

22. The device according to claim 20, wherein the mobile terminal comprises a Global Positioning System (GPS) receiver which acquires GPS information.

23. A method for discriminating among locations of a mobile terminal configured to communicate with a base station of a mobile communication system, the method comprising:
calculating a discrimination value depending on data for discrimination which includes the amount of a change in received power with respect to a predetermined power value and a duration of changing received power,
  wherein the received power is a received power level of a radio signal which the mobile terminal receives from the base station, and
  wherein the discrimination value is calculated using a linear discriminant which adds the duration multiplied by a first coefficient and the amount of the received power change multiplied by a second coefficient; and
determining the first and second coefficients based on data for training which includes amounts of received power changes for training and durations of changing received power for training.

24. A system comprising:
a base station of a mobile communication system;
a mobile terminal configured to communicate with the base station; and
a location-information discrimination device comprising:
  a discrimination value calculator configured to calculate a discrimination value depending on data for discrimination which includes the amount of a change in received power with respect to a predetermined power value and a duration of changing received power,
    wherein the received power is a received power level of a radio signal that the mobile terminal receives from the base station, and
    wherein the discrimination value calculator calculates the discrimination value using a linear discriminant which adds the duration multiplied by a first coefficient and the amount of the received power change multiplied by a second coefficient;

a determination section configured to determine whether the mobile terminal is located indoors or outdoors, based on a result of comparison between the discrimination value and a predetermined value; and a discriminant generator configured to determine the first and second coefficients based on data for training which includes amounts of received power changes for training and durations of changed reception powers for training.

* * * * *